_United States Patent_ [19]

Keagbine

[11] Patent Number: 4,951,767
[45] Date of Patent: Aug. 28, 1990

[54] VEHICLE SUSPENSION LOCK SYSTEM

[75] Inventor: Francis R. Keagbine, Portland, Oreg.

[73] Assignee: Allied Systems Company, Sherwood, Oreg.

[21] Appl. No.: 264,146

[22] Filed: Oct. 28, 1988

[51] Int. Cl.⁵ ............... B62D 55/00; B62D 37/00; B60S 9/205
[52] U.S. Cl. .................. 180/9.52; 280/6.12; 280/772; 364/424.05
[58] Field of Search .......... 280/840, 6.12, 112.2, 280/772; 180/9.1, 9.5, 9.52, 41; 364/424.05

[56] References Cited

U.S. PATENT DOCUMENTS

| | | | |
|---|---|---|---|
| 3,687,227 | 8/1972 | Reuter et al. | 180/112.2 |
| 4,236,591 | 12/1980 | Molby | 180/41 |
| 4,534,575 | 8/1985 | Grove et al. | 280/6.11 |
| 4,558,886 | 12/1985 | Straub | 280/840 |
| 4,580,797 | 4/1986 | Ericsson | 280/840 |
| 4,763,742 | 8/1988 | Langford | 180/9.1 |
| 4,823,852 | 4/1989 | Langford | 180/9.1 |
| 4,829,436 | 5/1989 | Kowalik et al. | 280/840 |

Primary Examiner—Charles A. Marmor
Assistant Examiner—Tamara L. Finlay
Attorney, Agent, or Firm—Marger & Johnson, Inc.

[57] ABSTRACT

A vehicle suspension lock system for a tree feller-buncher comprising a pair of pivot arms extending transversely from a vehicle frame. Track pods are mounted on the outer end of each pivot arm and a hydraulic cylinder is extensibly disposed between the frame and the pivot arm. A pilot-operated check valve in each cylinder prevents upward movement of the rod in its associated cylinder when the check valve is closed. The pilot port of each check valve is pressurized responsive to hydraulic fluid pressure used to drive the vehicle track pods thereby permitting fluid flow into and between the cylinders when the vehicle is moving and checking the flow from each cylinder when the vehicle is stationary to effect locking of the pivot arms for logging operations.

17 Claims, 3 Drawing Sheets

VEHICLE SUSPENSION LOCK SYSTEM

BACKGROUND OF THE INVENTION

I. Field of the Invention

The instant invention pertains to vehicle suspension systems and more particularly to such systems which facilitate vehicle travel over uneven terrain and which lock the suspension against movement to stabilize the vehicle when it stops.

II. Description of the Related Art

Excavating and construction machines such as backhoes, cranes and the like are used to lift loads, such as dirt or construction materials. Some such vehicles may be used to apply large forces to other objects as when a wrecking ball is suspended from a crane which is used to demolish a building.

Such vehicles incorporate suspension systems to facilitate vehicle travel. Some of these vehicle suspensions permit large amounts of relative movement between the suspension and the vehicle frame to facilitate travel over uneven terrain.

When such a vehicle is driven to the location at which it is to be used, it is important to fix the suspension system relative to the vehicle frame prior to lifting loads and/or otherwise applying force to effect proper and safe operation.

One type of vehicle incorporating a prior art suspension lock system is shown in U.S. Pat. No. 4,763,742 for a Tree Feller-Buncher, which is incorporated herein by reference and which is assigned to the assignee of this application. Generally speaking, the prior art Feller-Buncher comprises a four-track vehicle especially adapted for logging on steep slopes. Two of the tracks are mounted on opposing pivot arms which extend transversely outwardly from opposing sides of the vehicle frame and pivot therefrom. The other two tracks are fixed relative to the frame. The arms are linked together in such a way so that upward movement of one arm causes downward movement of the other arm, thereby tending to maintain the frame in an attitude parallel to the fixed tracks as the vehicle traverses a slope.

The prior art Feller-Buncher includes an articulated, extensible arm which is adapted for severing, bunching and moving trees and bunches of trees. In some applications, it is important to lock the pivot arms against pivoting movement when the articulated arm is used in order to stabilize the vehicle.

The prior art Feller-Buncher incorporated a pawl pivotally mounted on each pivot arm which could be selectively engaged and disengaged with one of a plurality of teeth formed on the frame thereby preventing upward movement of both pivot arms. The foregoing prior art vehicle suspension lock system is designed to permit the vehicle operator to lock the suspension from the vehicle controls rather than leaving the vehicle to install and/or adjust stabilizing arms or the like.

It would be desirable to utilize a vehicle suspension lock system which has fewer mechanical parts and which is less exposed to the brush and dirt encountered during operation of a tree feller-buncher than prior art systems. Such a system would require less maintenance and would be more reliable than prior art vehicle suspension lock systems.

SUMMARY OF THE INVENTION

The vehicle suspension lock system of the invention comprises a supporting arm pivotally-mounted at one end on a vehicle frame and having a track pod or wheel mounted on a free end thereof. The pod or wheel supports a portion of the vehicle for forward and rearward movement. A hydraulic cylinder is extensibly disposed between the frame and the supporting arm. Hydraulic fluid circuit means provides pressurized fluid to the cylinder. Valve means, responsive to means for detecting whether said vehicle is moving or stationary, permits fluid flow into and out of the cylinder when the vehicle is moving and blocks such flow when the vehicle is stationary.

It is an object of the present invention to provide an improved vehicle suspension lock system.

It is another object to provide such a system which automatically locks when the vehicle is stationary and automatically unlocks when the vehicle is moving.

It is a further object of the invention to provide such a lock system for any type of vehicle in which it may be desirable to lock the suspension system against movement.

The foregoing and other objects, features and advantages of the invention will become more readily apparent from the following detailed description of a preferred embodiment which proceeds with reference to the drawings.

DESCRIPTION OF THE PREFERRED EMBODIMENT

Figure 1:
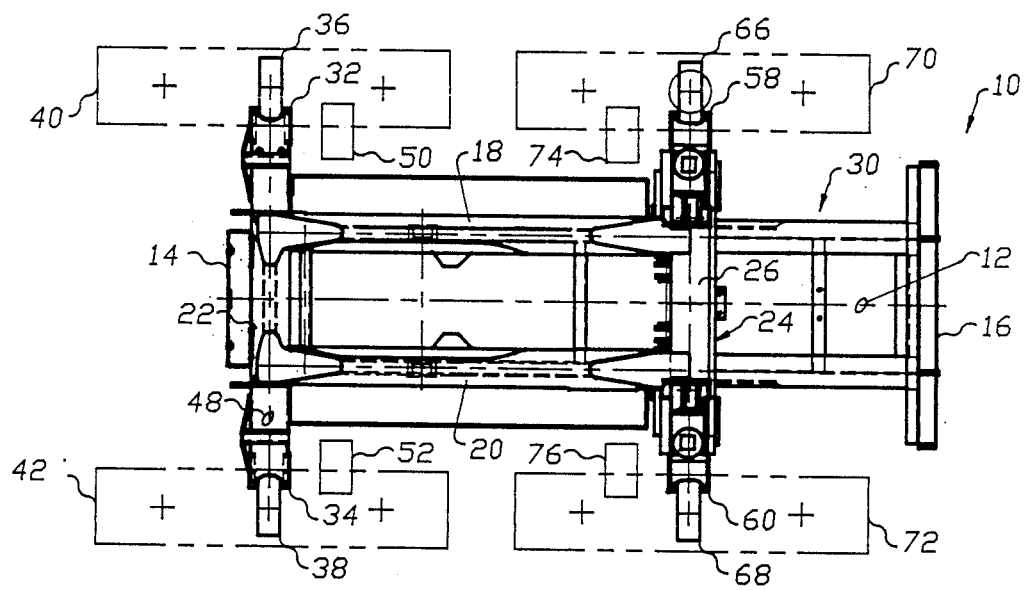
FIG. 1 is a top plan view of a vehicle frame for a tree-feller buncher.

Turning now to the drawing, particularly to FIGS. 1–4, indicated generally at 10 is a vehicle chassis or frame. Frame 10 is the frame for a tree-feller buncher similar to that disclosed in U.S. Pat. No. 4,763,742 issued to Langford for a tree feller-buncher. The upper unit of the feller-buncher, which includes an articulated arm and an operator seat and controls similar to the one shown in Langford, is not disclosed herein so that the instant embodiment of the vehicle suspension lock system can be more easily seen and understood.

Generally speaking, the tree feller-buncher into which the instant embodiment of the invention is incorporated comprises a four-track vehicle especially adapted for logging on steep slopes. The feller-buncher includes an articulated arm (not shown) for felling and gathering trees while the vehicle is positioned on a steep slope.

The frame includes a longitudinal axis, such being designated by dot-dashed line 12, a front end 14 and rear end 16. Frame 10 comprises a box frame including two laterally-spaced, longitudinally-extending frame members 18, 20. Members 18, 20 are parallel to one another and comprise I-beams or other structural members as may be required by the particular geometry, weight and size of the feller-buncher. Longitudinal frame members 18, 20 are joined by two transverse frame members 22, 24. Front frame member 22 is rigidly joined at its ends to the forward ends of longitudinal frame members 18, 20. Frame member 24 comprises an upper plate 26, an opposing substantially parallel lower plate (not visible), a forward plate 28 (in FIGS. 3 and 4) and an opposing substantially parallel rear plate (also not visible), all of which form a box comprising transverse frame member 24.

A rear frame extension 30 extends rearwardly from transverse frame member 24 and comprises a support for the prime mover, such comprising in the instant embodiment of the invention a hydraulic drive unit (not shown), for the tree-feller buncher. For the sake of clarity, frame 10 including rear frame extension 30, is not shown in the views of FIGS. 3 and 4.

Figure 2:
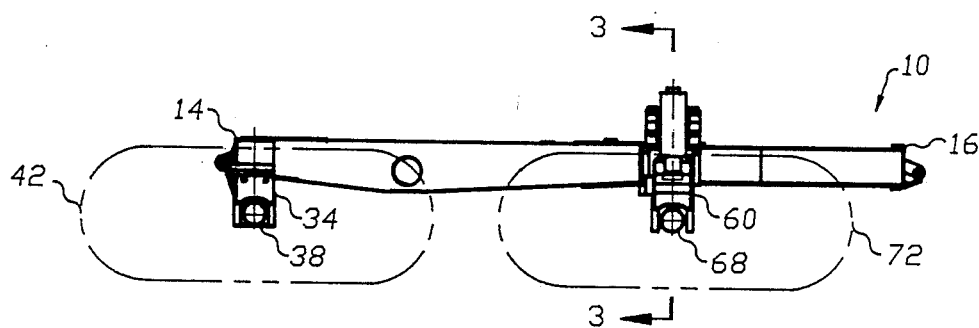
FIG. 2 is a side elevation view of the frame of FIG. 1.

First and second rigid arms 32, 34, shown in FIGS. 1 and 2, are mounted on and extend outwardly from the forward ends of frame 10. The respective outer ends of arms 32, 34 carry pod-mounting units 36, 38 upon which endless track pods 40, 42 (shown in dot-dash lines) are mounted.

Pod 42 is mounted on pod-mounting assembly 38 so that the entire pod can rotate about a generally transverse axis indicated by dot-dash line 48. The other pods are similarly mounted on their respective pod-mounting assemblies. All of the pods employed with the feller-buncher are constructed in the conventional manner, including a central walking beam, tooth wheels mounted at the end of the walking beam and an endless track draped over the tooth wheels. Each of the pods are independently powered by hydraulic motors 50, 52, 74, 76, which are in turn driven by a hydraulic pump in a manner which will be hereinafter more fully explained.

Figure 3:
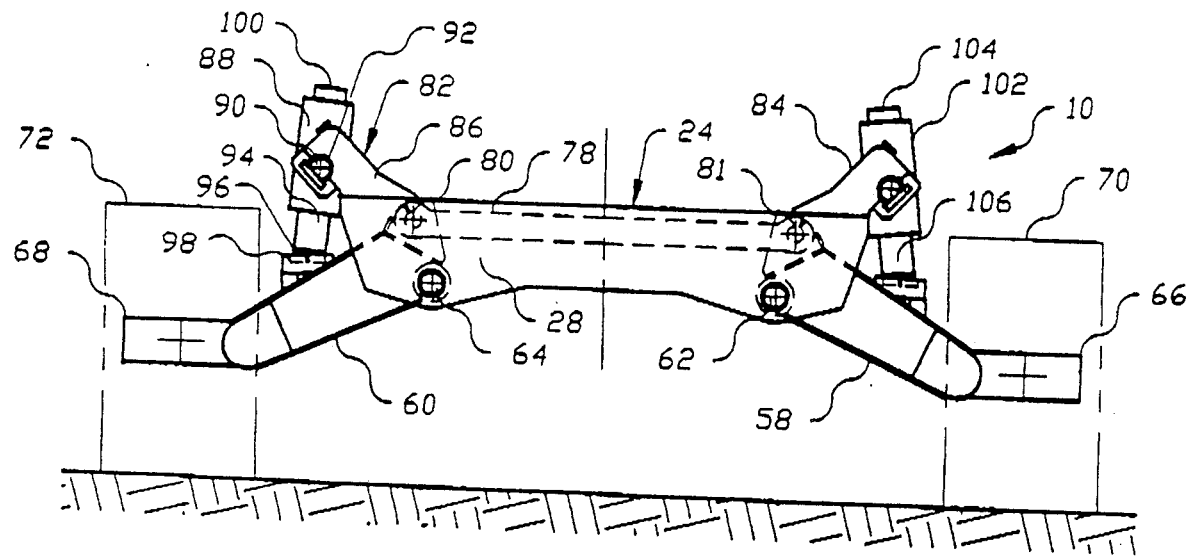
FIG. 3 is a view taken along line 3—3 in FIG. 2 with the vehicle frame on level terrain.

Referring to FIGS. 1 and 3, forward plate 28 and its opposing parallel rear plate (not visible), which make up a portion of transverse frame member 24, each extend laterally outward from opposing frame members 18, 20, thereby defining a pair of opposing yokes, between which supporting or pivot arms 58, 60 are mounted. Arms 58, 60 are mounted for pivotal movement on the yokes via shafts 62, 64 which are in turn journaled in conventional bearings mounted on the yokes. Thus, arms 58, 60 are mounted for pivotal movement about axes that are generally parallel to but offset from longitudinal axis 12 of frame 10. Pod-mounting units 66, 68, similar to those employed in conjunction with rigid arms 32, 34, mount pods 70, 72, respectively, to pivot arms 58, 60. Pods 70, 72 are substantially identical to pods 40, 42. Hydraulic motors 74, 76 (like motors 50, 52) are provided for powering pods 70, 72, respectively, in a manner which will be hereinafter more fully explained.

Referring to FIG. 3, frame 10 is shown as it appears when the pods are supported on level ground. Pivot arms 58, 60 are coupled together via an interconnecting link 78. This link is parallel to a line drawn between mounting shafts 62, 64 for pivot arms 58, 60 with the vehicle on even terrain as shown in FIG. 3. The left end of link 78 is coupled via a conventional yoke and pin assembly 80 at a location vertically offset from arm-mounting shaft 64. Similarly, the right end of link 78 is mounted via a suitable yoke and pin assembly 81 to the upper end of arm 58 at a location vertically offset from the right arm-mounting shaft 62. Thus, arms 58, 60 are connected by a two-bar, parallel linkage, one bar comprising the box forming transverse frame member 24 and the other arm comprising link 78.

Figure 4:
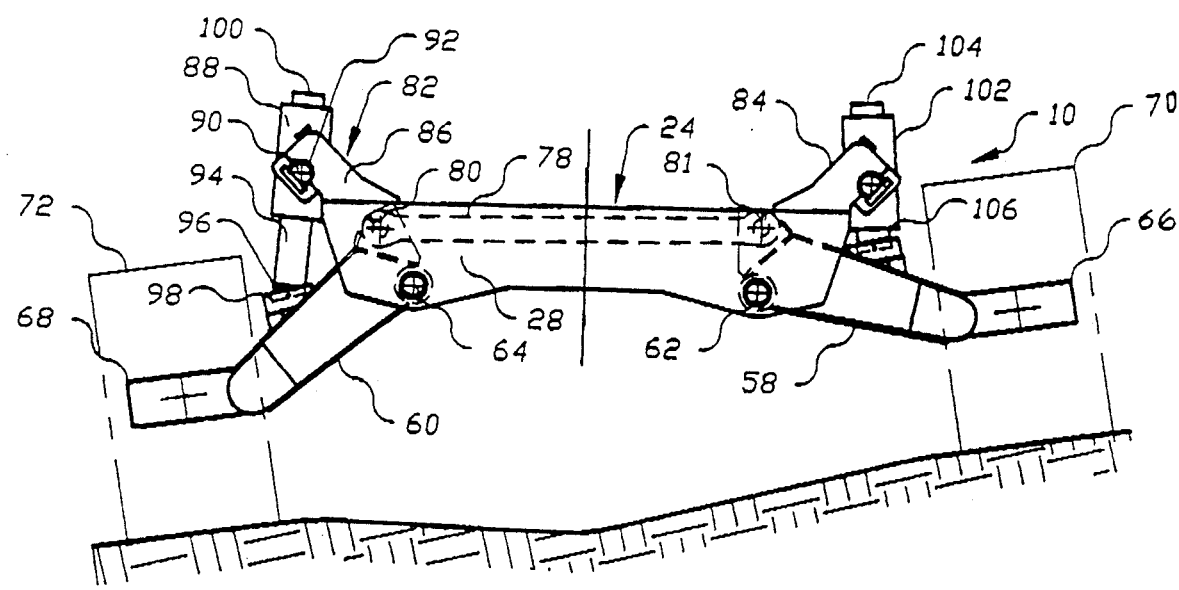
FIG. 4 is a view similar to FIG. 3 showing the vehicle frame on uneven terrain.

In FIG. 4, the suspension system is shown flexed to nearly its maximum extent. Right arm 58 is swung upwardly, while left arm 60 is swung downwardly by a substantially equal amount. It should be noted that when one arm is swung upwardly or downwardly, the opposing pivot arm is swung in the opposite direction by substantially the same amount under action of the previously-described two-bar, parallel linkage.

Fixedly mounted on transverse frame member 24 are opposing yoke assemblies 82, 84 (in FIGS. 3 and 4). Included in yoke assembly 82 is a substantially planar front member 86 and an opposing substantially planar rear member (not visible in FIGS. 3 and 4) mounted on frame member 24 directly behind member 86. A hydraulic cylinder 88 is received in yoke assembly 82 between front yoke member 86 and the rear yoke member (not visible). A pair of opposing shafts, one of which is shaft 90, extend from the outer surface of cylinder 88 on opposing sides thereof. Shaft 90 and its corresponding opposing shaft (not visible) are pivotally constrained in bushings, one of which is bushing 92 on front yoke member 86, which are mounted on each of the yoke members in yoke assembly 82. A rod 94 extends downwardly from cylinder 88 and terminates in a thrust bearing 96 which abuts against a thrust-bearing support 98. The support is fixedly mounted on pivot arm 60. A commercially-available pilot-operated check valve 100 is mounted on cylinder 88 via a manifold (not visible) for controlling flow into and out of cylinder 88 as will be hereinafter more fully explained. One suitable pilot-operated check valve is sold under the designation Sun Cavity T-19A. Similarly, yoke assembly 84 has a cylinder 102 rotatably constrained therein and a corresponding pilot-operated check valve 104 mounted thereon. A rod 106 extends from the lower end of cylinder 102 and terminates in a corresponding thrust-bearing and bearing support mounted on pivot arm 58.

Figure 5:
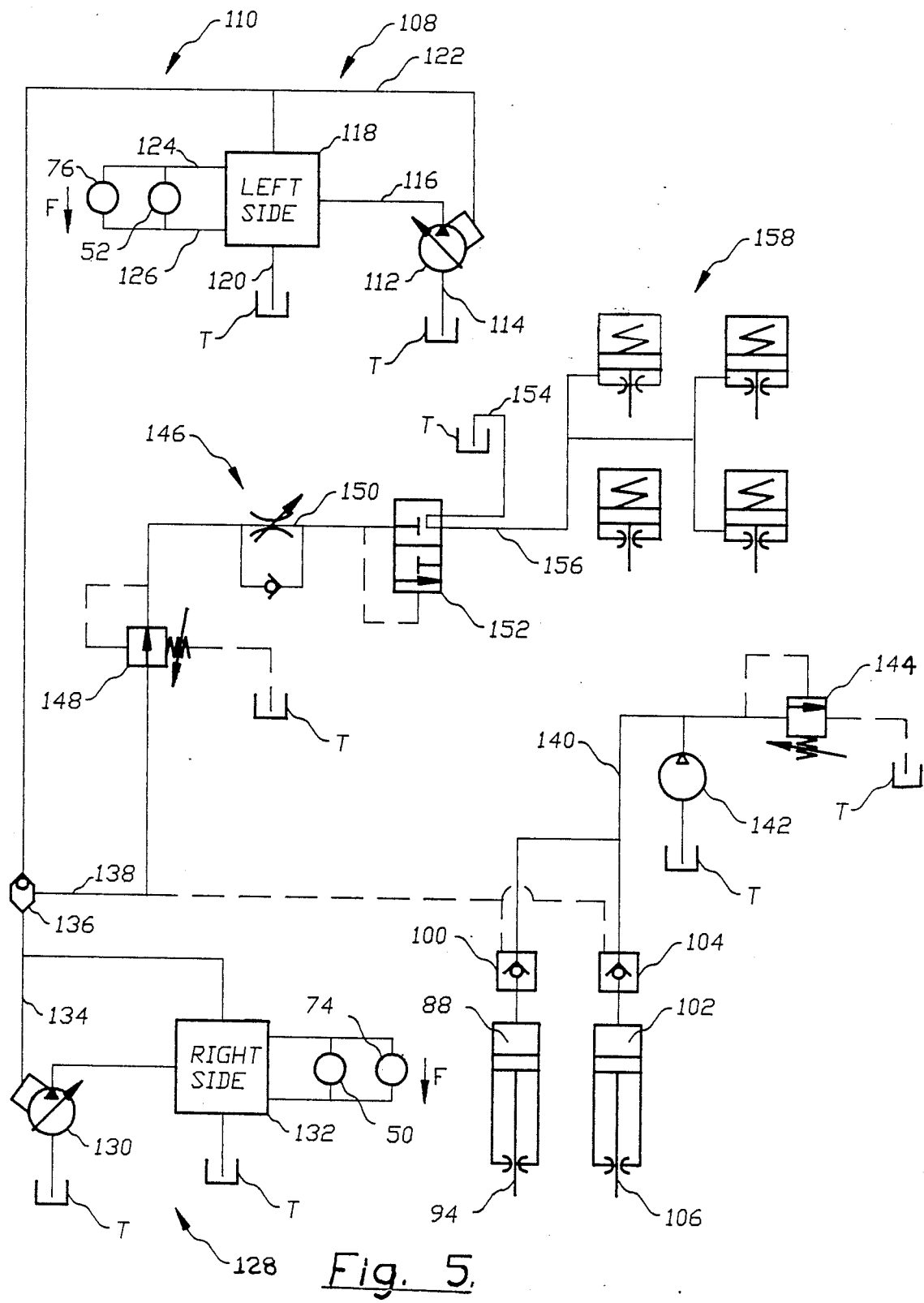
FIG. 5 is a simplified hydraulic schematic for controlling the vehicle suspension lock system of the instant embodiment of the invention.

Cylinders 88, 102 and their related pilot-operated check valves are interconnected in a hydraulic system, pertinent portions of which are illustrated in FIG. 5. Indicated generally at 108 in FIG. 5 is a portion of a hydraulic circuit used to drive and control the tree feller-buncher which incorporates frame 10. The usual cup-shaped symbol for a supply and return tank appears at several places in FIG. 5 and, in each place, is designated by the letter "T." Structure which has been previously identified in the views of FIGS. 1–4 retains the same identifying numeral in the schematic of FIG. 5.

Indicated generally at 110 is a left-side travel motor control subcircuit. Included therein is a pump 112 having an inlet line 114 and an outlet line 116. Outlet line 116 is connected to the inlet of a commercially available four-way valve 118, one such suitable valve being manufactured by Vickers and identified by the model number CMX 250. In addition to the inlet to which line 116 is connected, valve 118 includes an outlet 120, which is connected to the tank, a load sense port, such being connected to line 122, and a pair of working ports connected to lines 124, 126. Motors 52, 76, mounted on the left-side travel pods, are placed in parallel across lines 124, 126. When fluid flows through valve 118 under pressure from pump 112, a valve control (not shown) controlled by an operator of the tree feller-buncher, can be used to determine the flow rate of hydraulic oil in lines 124, 126 and the direction of flow. When oil flows from valve 118 into line 124, through motors 52, 76 and back to the valve via line 126, the motors cause forward movement of the track pods to which they are connected. When flow is in the opposite direction, i.e., through line 126, through the motors and back to the valve via line 124, the motors cause rearward movement of the track pods. The flow rate determines the speed of rotation and hence the vehicle speed.

The load sense port, connected to line 122, of valve 118 senses the pressure required to force oil into line 124 or 126 when the operator activates valve 118. In the design of FIG. 5, 1,000 psi is typically required to be applied to motors 52, 76 before track pod movement begins. The force in the load sense port can range as high as 4,000 psi.

Indicated generally at 128 is a right-side travel motor control subcircuit. Subcircuit 128 includes a pump 130, such being substantially identical to pump 112, and a four-way valve 132 which is substantially identical to valve 118. The load sense port of valve 132 is connected to a line 134. The structure and operation of subcircuit 128 is substantially identical to that of subcircuit 110.

Lines 122, 134 are connected to a pair of inlets on a conventional shuttle valve 136. The outlet of shuttle valve 136 is connected to a line 138 which in turn is connected to the pilot ports of check valves 100, 104. When pressure appears on the load sense port of valve 118 and when there is no pressure on the load sense port of valve 132, fluid flow occurs via line 122 through shuttle valve 136 into line 138. Conversely, when there is no pressure on the load sense port of valve 118 and the valve 132 load-sense port is pressurized, flow is from line 134, through the shuttle valve and into line 138. When both load sense ports are pressurized, flow is via both lines 122, 134, through valve 136 and into line 138. Thus, when either the left-side or right-side motors are energized for forward or rearward movement, pressure appears on line 138.

When valves 118, 132 are operated so that no flow occurs through the working ports and into the associated motors, no pressure appears on line 138.

Pilot-operated check valves 100, 104 have their inlets connected to line 140 and their outlets connected to cylinders 88, 102, respectively. Line 140 is connected to the outlet of a pump 142 having its inlet in fluid communication with the supply tank. A commercially-available regulating valve 144 bleeds flow in line 140 to the tank in order to prevent the pressure in line 140 from rising above approximately 550 psi.

When pressure appears on line 138, check valves 100, 104 are biased into an open condition and remain open for so long as line 138 is pressurized. When line 138 remains unpressurized, valves 100, 104 operate in the usual manner, i.e., flow is permitted from the inlet to the outlet but not in the opposite direction. When line 138 is pressurized, flow may occur in either direction.

Indicated generally at 146 is a brake control subcircuit. Included therein is a commercially-available pressure reducing valve 148 having an inlet connected to line 138 and an outlet connected to a commercially-available flow control valve 150. In the circuit of FIG. 5, pressure-reducing valve 148 automatically reduces the pressure at the inlet of valve 148 to 1,000 psi. The outlet of valve 150 is connected to the inlet of a commercially-available three-way valve 152. Valve 152 includes a pair of outlets, one being connected to line 154 and the other to line 156. Valve 152 operates in a conventional manner by sensing pressure at the inlet of the valve and blocking flow from the inlet to lines 154, 156 until pressure at the inlet rises above a preselected value, in the circuit of FIG. 5, that value being 900 psi. Once the preselected pressure is achieved, the valve shifts positions and passes flow from the inlet thereof into line 156. Line 156 is connected to four hydraulic rams, such being indicated generally at 158. Each of the rams is a part of one of four conventional disc brakes mounted on the feller-buncher which are deactivated in response to pressure on line 156. The rams are biased into an extended condition to maintain the brakes in an activated condition in the absence of ram fluid pressure.

Thus, subcircuit 146 functions to pressurize brake rams 158 at a pressure between 900 psi, the pressure at which valve 152 permits flow, and a pressure of 1,000 psi, the pressure to which valve 148 reduces the pressure in line 138. Such occurs only when a pressure of greater than 900 psi appears in line 138.

Considering now the operation of the vehicle suspension lock system of the instant embodiment of the invention, attention is directed to FIGS. 3 through 5.

OPERATION

In operation, the tree feller-buncher incorporating frame 10 traverses a wooded slope until the operator locates a suitable position for stopping and thereafter felling and bunching trees using the articulated arm (not shown). As the vehicle moves in a generally forward direction, flow occurs through motors 52, 76 via lines 124, 126 and through motors 50, 74 via their associated hydraulic fluid lines. When such occurs, pressure is developed at the load sense port on each valve 118, 132 which in turn generates pressure, as previously described, in line 138 via shuttle valve 136. It is to be appreciated that the pressure appears on line 138 even if only the left-side or right-side motors are energized as may be the case when the vehicle is turning. When the vehicle is in motion, the pressure in line 138 is typically substantially over 1,000 psi, thereby placing approximately 1,000 psi, via pressure-reducing valve 148, at the inlet of valve 152. As will be recalled, when in excess of 900 psi is placed at the inlet of valve 152, brake rams 158 are exposed to pressure in line 156 thereby maintaining the disc brakes (not shown) in a deactivated condition to permit vehicle travel.

Check valves 100, 104 are maintained in an open condition, also responsive to the pressure in line 138. As the vehicle moves across the ground, the linkage, comprising link 78 and transverse frame member 24, between pivot arms 58, 60 forces adjustment in frame attitude in order to maintain the same substantially parallel to pods 40, 42 as the vehicle traverses uneven ground as shown in FIG. 4. Since check valves 100, 104 are biased open as result of the pressure in line 138, rods 94, 106 are free to move upwardly and downwardly forcing fluid from one cylinder to the other responsive to upward and downward movement of the pivot arm associated with the rod.

When the vehicle arrives at a suitable location for felling and/or bunching trees, the operator manipulates the controls to stop forward motion by stopping flow in valves 118, 132 and thereby eliminates the pressure on the load sense ports of each valve. This pressure drop is communicated via lines 122, 134, which are connected to the load sense ports of valves 118, 132 and to line 138 via shuttle valve 136. With the pressure so reduced, pressure on the inlet of valve 152 in brake control subcircuit 146 decreases below 900 psi thereby shifting the position of valve 152, venting line 156 to the tank via line 154 and blocking inlet flow. When such occurs, pressure in line 156 drops to the point at which rams 158 are no longer pressurized sufficiently to maintain them in a contracted condition and they extend, thereby actuating the disc brakes and locking the vehicle from further travel responsive to track movement.

Substantially simultaneously, check valves 100, 104 shut in response to an absence of pressure in line 138. As shown in the view of FIGS. 3 and 4, pivot arms 58, 60 are each pivotally connected to cylinder rods 106, 94, respectively. The previously-described linkage system comprising transverse frame member 24 and link 78 operates to cause the pivot arms to move in opposition to one another, i.e., when one moves in an upward direction, the other is forced downwardly thereby pivoting frame 10 to maintain it in a substantially level condition as the vehicle traverses a slope, best illustrated in the view of FIG. 4.

Check valves 100, 104 prevent all upward or downward movement of both pivot arms in the absence of pressure on line 138. It can be seen that no flow is possible from either cylinder toward line 140 since the valves check such flow. Even if the support should fail beneath one of the track pods, e.g., track pod 70, rod 106 is stopped from downward movement, because, as will be recalled, the linkage system interconnecting the pivot arms would require a corresponding upward movement of pivot arm 60, connected to rod 94, and such is impossible because of the action of check valve 100 on the fluid within cylinder 88. Even if both pods were no longer supported on the ground, they would remain locked in the relative positions they were in when pressure was removed from line 138. Since downward movement of one pod would always require upward movement of the other, when pressure is absent from line 138, all downward movement of both pods is prevented.

It is to be appreciated that additions and alterations can be made to the instant embodiment of the invention without departing from the spirit thereof which is defined in the following claims.

I claim:

1. A vehicle suspension lock system comprising:
   a supporting arm pivotally mounted on one side of a chassis of a vehicle and having a track pod or wheel mounted on a free end thereof supporting a portion of the vehicle for forward and rearward movement;
   a first hydraulic cylinder extensibly disposed between said chassis and said supporting arm;
   a hydraulic fluid circuit means for providing pressurized fluid to said cylinder;
   means for detecting whether said vehicle is moving or stationary;
   valve means responsive to said detecting means for permitting fluid flow into and out of said cylinder when said vehicle is moving and blocking such flow when said vehicle is stationary;
   a second supporting arm pivotally mounted on said chassis;
   a second hydraulic cylinder operatively disposed between said chassis and said second supporting arm, said valve means further including means for permitting fluid flow between said second hydraulic cylinder and said first hydraulic cylinder when said vehicle is moving; and
   a rigid link pivotally connected at one end thereof to said first supporting arm and pivotally connected at the other end thereof to said second supporting arm.

2. The vehicle suspension lock system of claim 1 wherein said system further includes brake means and wherein said actuating said brake means responsive to the absence of vehicle movement.

3. The vehicle suspension lock system of claim 1, wherein said valve means further includes means for blocking fluid flow into and out of said second cylinder when said vehicle is stationary.

4. The vehicle suspension lock system of claim 1, wherein said system is mounted on a vehicle having a hydraulic drive unit and said detecting means is operatively connected to said drive unit.

5. The vehicle suspension lock system of claim 1, wherein the free end of each supporting arm is operatively connected to an endless track powered by the hydraulic drive unit.

6. A vehicle suspension lock system for a vehicle having a chassis comprising:
   a first supporting arm pivotally attached to the vehicle chassis on a first lateral side thereof and having a first track pod mounted on a free end thereof supporting a portion of the vehicle for forward and rearward movement;
   a second supporting arm pivotally attached to said chassis on a second lateral side thereof opposite the first side and having a second track pod mounted on a free end thereof supporting a portion of the vehicle for forward and rearward movement;
   a first hydraulic cylinder operatively disposed between said first supporting arm and the first side of the chassis;
   a second hydraulic cylinder operatively disposed between said second supporting arm and the second side of said chassis;
   hydraulic fluid circuit means for providing pressurized fluid flow into and between said cylinders at a predetermined pressure;
   means for detecting when said vehicle is moving or stationary;
   valve means responsive to said detecting means for permitting fluid flow into and out of said cylinders when said vehicle is moving and blocking such flow when said vehicle is stationary; and
   a rigid link pivotally connected at one end thereof to said first supporting arm and pivotally connected at the other end thereof to said second supporting arm.

7. A suspension lock system according to claim 6 in which:
   the vehicle includes a prime mover engageable for powering forward and rearward movement of the vehicle; and
   said detecting means includes means for detecting engagement and disengagement of the prime mover for powering movement of the vehicle.

8. The vehicle suspension lock system of claim 6 wherein said system further includes brake means and wherein said detecting means is operatively connected to said brake means for actuating said brake means for actuating said brake means responsive to the absence of vehicle movement.

9. A suspension lock system according to claim 6 in which the hydraulic fluid circuit means includes a hydraulic pump for pumping such fluid and means for maintaining said predetermined pressure substantially constant.

10. A suspension system for a vehicle chassis having a longitudinal axis substantially paralleling the direction of vehicle travel, said system comprising:
- a first supporting arm pivotally attached to such a chassis about a pivot axis substantially parallel to the longitudinal chassis axis, said first supporting arm being attached to one side of said chassis;
- a second supporting arm pivotally attached to such a chassis about a pivot axis substantially parallel to the longitudinal chassis axis, said second supporting arm being attached to the other side of said chassis substantially opposite said first supporting arm;
- a first hydraulic cylinder operatively disposed between said first supporting arm and said chassis;
- a second hydraulic cylinder operatively disposed between said second supporting arm and said chassis;
- means for providing pressurized fluid flow into and between said cylinders when said vehicle is moving;
- means for preventing such flow when said vehicle is stationary; and
- a rigid link pivotally connected at one end thereof to said first supporting arm and pivotally connected at the other end thereof to said second supporting arm.

11. The suspension system of claim 10 wherein said pressurized fluid is maintained at a substantially constant pressure.

12. The suspension system of claim 10 wherein said means for preventing such flow comprises a check valve.

13. The suspension system of claim 10 wherein said system further includes brake means and wherein said means for preventing flow when said vehicle is stationary is operatively connected to said brake means for actuating said brake means when vehicle is stationary.

14. A four track vehicle especially adapted for logging on steep slopes comprising:
- a frame having a longitudinal dimension and a transverse dimension;
- a first rigid arm extending transversely outward from and rigidly affixed to said frame adjacent one end thereof;
- a second rigid arm extending transversely outward from and rigidly affixed to the opposite side of said frame adjacent said one end;
- a first pivot arm extending transversely outward from one side of said frame adjacent the opposite end of said frame, and means for pivotally connecting said first arm to said frame for swinging movement about a first longitudinal axis offset from the longitudinal centerline of said frame;
- a second pivot arm extending transversely outward from the opposite side of said frame adjacent the opposite end of said frame, and means for pivotally connecting said second pivot arm to said frame for swinging movement about a second longitudinal axis offset from the longitudinal centerline of said frame;
- first and second pods carrying endless tracks connected to the respective outer ends of said first and second rigid arms and third and fourth pods carrying endless tracks connected to the respective outer ends of said first and second pivot arms;
- a first hydraulic cylinder operatively disposed between said first pivot arm and said one side of the frame;
- a second hydraulic cylinder operatively disposed between said second pivot arm and said opposite side of the frame;
- means for providing pressurized fluid flow into and between said first and second cylinders when said vehicle is moving; and
- means for providing pressurized fluid flow into and between said first and second cylinders when said vehicle is moving; and
- means for preventing such flow when said vehicle is stationary.

15. The vehicle of claim 14 wherein said vehicle further includes a rigid link pivotally connected at one end thereof to said said first pivot arm and pivotally connected at the other end thereof to said second pivot arm.

16. The four track vehicle of claim 14 wherein said vehicle further includes brake means and wherein said means responsive to absence of vehicle driving action is operatively connected to said brake means for actuating said brakes means responsive to absence of vehicle driving action.

17. A vehicle suspension lock system for a vehicle having a chassis comprising:
- a first supporting arm pivotally attached to the vehicle chassis on a first lateral side thereof and having a first track pod mounted on a free end thereof supporting a portion of the vehicle for forward and rearward movement;
- a second supporting arm pivotally attached to said chassis on a second lateral side thereof opposite the first side and having a second track pod mounted on a free end thereof supporting a portion of the vehicle for forward and rearward movement;
- a first hydraulic cylinder operatively disposed between said first supporting arm and the first side of the chassis;
- a second hydraulic cylinder operatively disposed between said second supporting arm and the second side of said chassis;
- hydraulic fluid circuit means for providing pressurized fluid flow into and between said cylinders at a predetermined pressure;
- a prime mover shiftable between one of a forward and reverse positions for powering the track pods for forward or reverse movement;
- a hydraulic drive circuit connected to said prime mover for causing track pod movement by providing a flow of pressurized fluid to said prime mover, said hydraulic drive circuit stopping track pod movement by stopping such flow;
- means for detecting when said vehicle is moving or stationary, said detecting means including means coupled to the hydraulic drive circuit for sensing a hydraulic pressure in the drive circuit indicative of whether or not the track pods are moving; and
- valve means responsive to said detecting means for permitting fluid flow into and out of said cylinders when said vehicle is moving and blocking such flow when said vehicle is stationary.

* * * * *

UNITED STATES PATENT AND TRADEMARK OFFICE
CERTIFICATE OF CORRECTION

PATENT NO. : 4,951,767

DATED : August 28, 1990

INVENTOR(S) : Francis R. Keagbine

It is certified that error appears in the above-identified patent and that said Letters Patent is hereby corrected as shown below:

Column 10, line 26, change "said brakes means" to
--said brake means--.

Signed and Sealed this

Twenty-sixth Day of May, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,951,767
DATED : August 28, 1990
INVENTOR(S) : Francis R. Keagbine It is certified that error appears in the above-identified patent and that said Letters Patent is hereby corrected as shown below:

Column 8, Line 5: Between "wherein said" and "actuating said" insert --detecting means is operatively connected to said brake means for--.

Column 10, Lines 12, 13 and 14: Please delete the entirety of these lines: "means for providing pressurized fluid flow into and between said first and second cylinders when said vehicle is moving; and".

Signed and Sealed this

Thirty-first Day of August, 1993

Attest:

BRUCE LEHMAN

Attesting Officer          Commissioner of Patents and Trademarks